(12) United States Patent
Inagawa

(10) Patent No.: US 11,257,128 B2
(45) Date of Patent: Feb. 22, 2022

(54) SHOPPING SUPPORT SYSTEM AND SHOPPING SUPPORT METHOD

(71) Applicant: TOSHIBA TEC KABUSHIKI KAISHA, Tokyo (JP)

(72) Inventor: Nobuhiro Inagawa, Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 3 days.

(21) Appl. No.: 16/990,359

(22) Filed: Aug. 11, 2020

(65) Prior Publication Data
US 2021/0110452 A1 Apr. 15, 2021

(30) Foreign Application Priority Data
Oct. 11, 2019 (JP) .............................. JP2019-188027

(51) Int. Cl.
| | | |
|---|---|---|
| G06Q 30/02 | (2012.01) | |
| G06Q 30/06 | (2012.01) | |
| G06Q 10/08 | (2012.01) | |
| G06Q 30/00 | (2012.01) | |
| G07C 9/00 | (2020.01) | |
| G06Q 50/26 | (2012.01) | |
| G06Q 20/20 | (2012.01) | |

(Continued)

(52) U.S. Cl.
CPC ....... *G06Q 30/0281* (2013.01); *G06Q 10/087* (2013.01); *G06Q 30/0185* (2013.01); *G06Q 30/0613* (2013.01); *G06Q 30/0633* (2013.01); *G06Q 30/0639* (2013.01); *G06Q 50/265* (2013.01); *G07C 9/00896* (2013.01); *G06F 3/0482* (2013.01); *G06K 7/1413* (2013.01); *G06K 7/1417* (2013.01); *G06Q 20/201* (2013.01); *G06Q 20/202* (2013.01); *G06Q 20/203* (2013.01)

(58) Field of Classification Search
None
See application file for complete search history.

(56) References Cited

U.S. PATENT DOCUMENTS

| | | | | |
|---|---|---|---|---|
| 10,484,503 B1 * | 11/2019 | Bragdon | ............... | H04L 67/327 |
| 2019/0073654 A1 * | 3/2019 | Barkan | ............... | G06Q 20/208 |
| 2019/0073655 A1 * | 3/2019 | Barkan | ............... | G06K 7/1413 |

FOREIGN PATENT DOCUMENTS

| | | | | |
|---|---|---|---|---|
| JP | 2005-173842 A | | 6/2005 | |
| WO | WO-0206983 A2 * | | 1/2002 | ............. G06Q 30/02 |

OTHER PUBLICATIONS

Anon., "IncredibleArt.com Is the Solution for Discovering and Purchasing Art Online," Business Wire [New York] Oct. 12, 1999. (Year: 1999).*

(Continued)

*Primary Examiner* — Nicholas D Rosen
(74) *Attorney, Agent, or Firm* — Foley & Lardner LLP

(57) ABSTRACT

A shopping support system includes processing circuitry having programmed instructions to determine if a commodity is collected for purchase by a purchaser at a sales floor of a store. The shopping support system determines if the commodity has been postponed for later collection based on an action of the purchaser on the commodity at the sales floor. Then, the shopping support system provides a notification in response to a determination that the commodity has been postponed for later collection and is not collected for purchase by the purchaser.

20 Claims, 12 Drawing Sheets

(51) Int. Cl.
    *G06F 3/0482*     (2013.01)
    *G06K 7/14*     (2006.01)

(56)     References Cited

OTHER PUBLICATIONS

EPO and Google machine translation of the Description of Fujisaki, Japanese Patent Publication JP2005173842A, machine translation performed Aug. 27, 2021. (Year: 2021).*

EPO and Google machine translation of the Claims of Fujisaki, Japanese Patent Publication JP2005173842A, machine translation performed Aug. 27, 2021. (Year: 2021).*

Schreiber Translations, Inc., human translation of Fujisaki, Japanese Patent Publication JP2005173842A, translation obtained Sep. 14, 2021. (Year: 2021).*

* cited by examiner

| MEMBER ID | TERMINAL ID | TRACKING ID |
|---|---|---|
|  |  |  |
|  |  |  |
|  |  |  |
|  |  |  |

SHOPPING SUPPORT SYSTEM AND SHOPPING SUPPORT METHOD

CROSS-REFERENCE TO RELATED APPLICATION

This application is based upon and claims the benefit of priority from Japanese Patent Application No. 2019-188027, filed on Oct. 11, 2019, the entire contents of which are incorporated herein by reference.

FIELD

Embodiments described herein relate generally to a shopping support system and a shopping support method.

BACKGROUND

Various shopping support systems were devised for creating a list of commodities to be purchased and notifying the user of commodities forgotten to be purchased.

As an example, in a shopping support system, a list of commodities to be purchased is acquired from a user terminal before shopping. During shopping, a barcode or the like of the commodity put in a shopping cart is recognized and a list of commodities in the shopping cart is created. Then, based on the comparison result between the list of commodities to be purchased and the list of commodities in the shopping cart, a forgotten purchase list is created, and a user terminal is notified of the forgotten purchase list.

In such a shopping support system, it is necessary to create a list of commodities to be purchased before shopping. However, there is a possibility that a commodity that was not planned to be purchased is put into a shopping cart and purchased at a sales floor (for example, from a commodity shelf, a display case, a display stand, and the like). If the commodity that was not planned to be purchased is a commodity that is better to be put in the shopping cart immediately before checkout, such as a frozen food, a refrigerated food, a large and bulky commodity, or the like, it is conceivable to postpone the commodity at the time of shopping around. By postponing, there is a concern to forget to purchase the commodity later.

DETAILED DESCRIPTION

A problem to be solved by at least one embodiment herein is to provide a shopping support system and a shopping support method that prevent a forgotten purchase of a postponed commodity.

In general, according to at least one embodiment, the shopping support system includes a purchased commodity specifying unit, a postponed commodity specifying unit, and an informing unit. The purchased commodity specifying unit specifies a commodity purchased by a purchaser at a sales floor. The postponed commodity specifying unit specifies a commodity whose purchase is postponed based on an action of the purchaser on the commodity at the sales floor. The informing unit informs when there is a commodity specified by the postponed commodity specifying unit and not specified by the purchased commodity specifying unit.

Hereinafter, embodiments of a shopping support system and a shopping support method will be described with reference to the drawings.

First Embodiment

Figure 1:
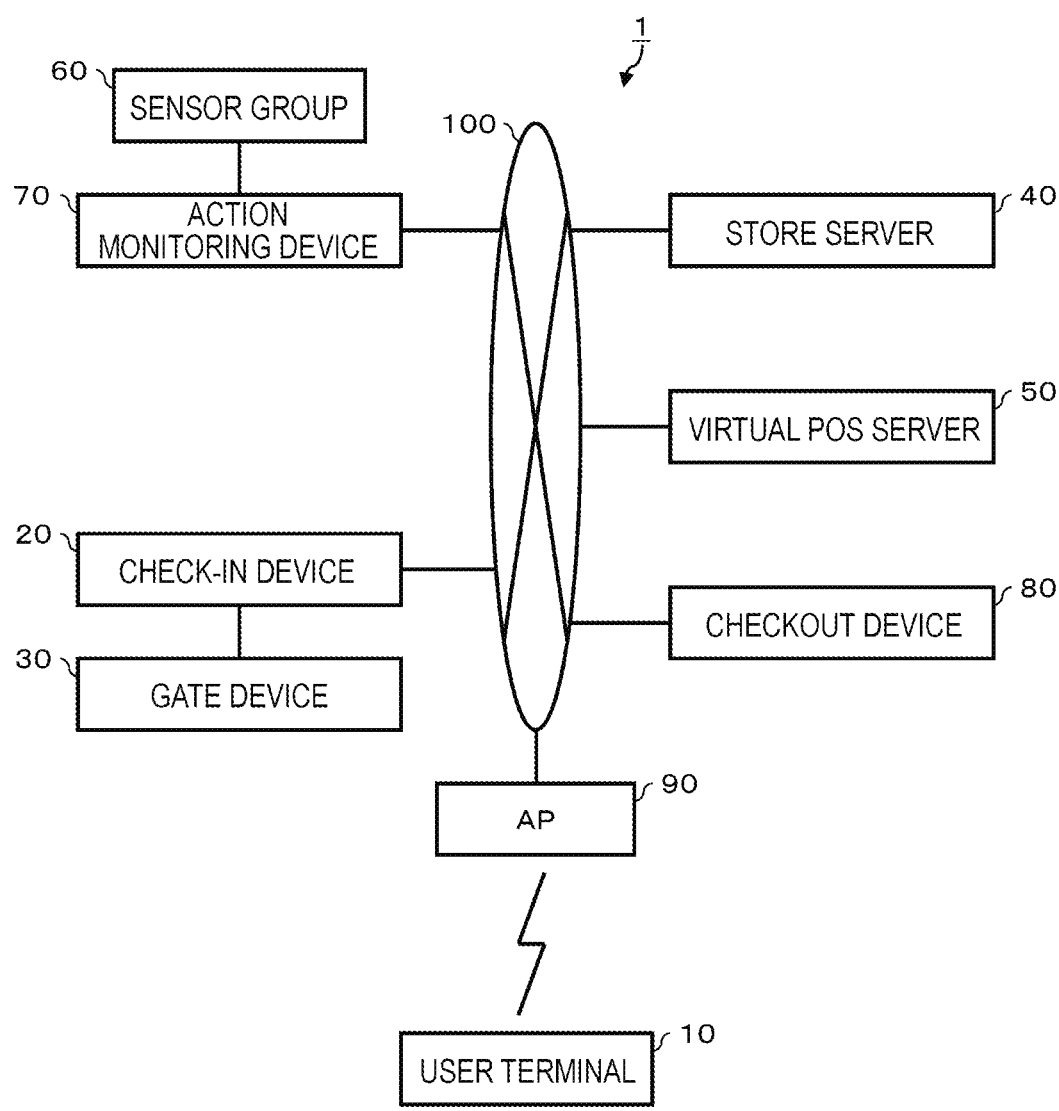
FIG. 1 is a schematic diagram showing a schematic configuration of a shopping support system according to an embodiment.

FIG. 1 is a schematic diagram showing a schematic configuration of a shopping support system 1 according to the present embodiment. The shopping support system 1 includes a user terminal 10, a check-in device 20, a gate device 30, a store server 40, a virtual POS server 50, a sensor group (a plurality of sensors) 60, an action monitoring device 70, a checkout device 80, and an access point 90. The gate device 30 is connected to the check-in device 20. The sensor group 60 is connected to the action monitoring device 70. The user terminal 10 enables wireless communication with the access point 90. The access point 90 is connected to a communication network 100 together with the check-in device 20, the store server 40, the virtual POS server 50, the action monitoring device 70, and the checkout device 80. Thus, the user terminal 10 connected to the access point 90 by wireless communication can perform data communication with the check-in device 20, the store server 40, the virtual POS server 50, the action monitoring device 70, or the checkout device 80 via the communication network 100.

The communication network 100 is, for example, a local area network (LAN). The LAN may be a wired LAN or a wireless LAN.

The user terminal 10 (e.g., a user interface) is a portable communication terminal. The details will be described later, and the user terminal 10 has hardware for reading at least a data code such as a barcode or a two-dimensional code. For example, a smartphone equipped with a digital camera owned by a purchaser who is a customer and a tablet terminal owned by a store attached to a shopping cart can be used as the user terminal 10.

The check-in device 20 receives a check-in operation for the purchaser to enter the store. In the present embodiment, one gate device 30 (e.g., a gate, a gate actuator, etc.) is provided for one check-in device 20. The gate device 30 selectively forms an open state in which the purchaser is allowed to enter the store and a closed state in which the purchaser is prevented from entering the store (i.e., selectively prevents a purchaser from entering the store), under instructions from the paired check-in device 20. As the gate device 30, for example, a known device that opens and closes a door that blocks a passage can be used. The gate device 30 has a function of detecting the passage of a purchaser.

The store server 40 is a computer that supports all store operations. The virtual POS server 50 is a computer that cooperates with the user terminal 10 to provide support for making it appear as if a known POS terminal is operating.

The sensor group 60 includes a large number of sensors arranged in the store. Each of the large number of sensors detects the action of the purchaser and the display status of the commodity. These sensors are, for example, cameras, optical sensors, infrared sensors, temperature sensors, or weight sensors.

The action monitoring device 70 (e.g., an action monitor, a tracker, etc.) monitors the action of the purchaser and the display status of the commodity based on the detection result of the sensor group 60. Specifically, the action monitoring device 70 tracks a purchaser who entered the store through a gate provided with the gate device 30. The action monitoring device 70 monitors a purchase action in which the purchaser collects a commodity a commodity displayed in the sales floor (e.g., picks up and stores the commodity in a container such as a shopping cart), a return action in which the purchaser returns the collected (e.g., picked-up) commodity to the sales floor, and a checkout action in which the purchaser moves to a checkout place (e.g., a checkout area) where the checkout device 80 is installed. Such an action monitoring device 70 can apply known technology utilized in a system of an unmanned store as it is. Therefore, the detailed description thereof is omitted here.

The checkout device 80 (e.g., a checkout system or register, etc.) executes a calculation process for calculating the amount of the price for the commodities purchased by the purchaser and a settlement process for settling the price. As the checkout device 80, for example, a checkout device compatible with a known self-service checkout method can be applied as it is. Therefore, the detailed description thereof is omitted here.

The access point 90 is a communication facility installed in a store as a relay base and utilized when each server (i.e., the store server 40, the virtual POS server 50, and the like) of the shopping support system 1 performs data communication with the user terminal 10 via the wireless LAN. The wireless LAN conforms to, for example, the Wi-Fi (registered trademark) standard. Although FIG. 1 shows only one access point 90, the number of access points 90 is not limited. A plurality of access points 90 may be connected to the communication network 100 depending on the size of the store or the like.

Figure 2:
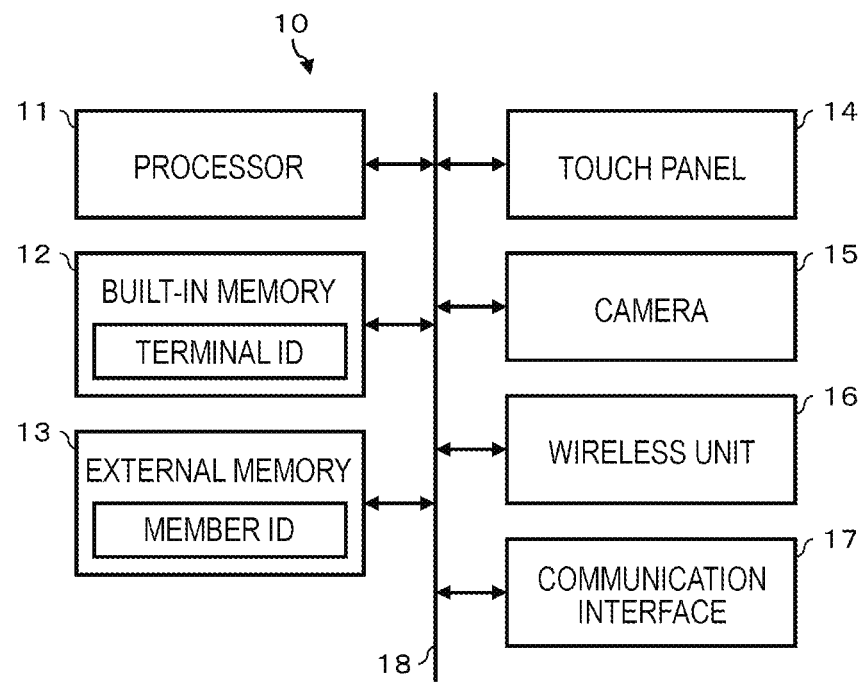
FIG. 2 is a block diagram showing a main part circuit configuration of a user terminal shown in FIG. 1.

FIG. 2 is a block diagram showing a main part circuit configuration of the user terminal 10. As shown in FIG. 2, the user terminal 10 includes a processor 11, a built-in memory 12, an external memory 13, a touch panel 14, a camera 15, a wireless unit 16, a communication interface 17, and a system transmission line 18.

The system transmission line 18 includes an address bus, a data bus, a control signal line, and the like. In the user terminal 10, the processor 11, the built-in memory 12, the external memory 13, the touch panel 14, the camera 15, the wireless unit 16, and the communication interface 17 are connected to the system transmission line 18. The processor 11, the built-in memory 12, and the external memory 13 are connected by the system transmission line 18 to configure a computer that performs information processing for controlling the user terminal 10.

The processor 11 corresponds to a central part of the computer. The processor 11 controls each unit to realize various functions as the user terminal 10 according to an operating system or an application program. The processor 11 is, for example, a central processing unit (CPU).

The built-in memory 12 corresponds to a main storage part of the computer. The built-in memory 12 includes a nonvolatile memory area and a volatile memory area. The built-in memory 12 stores an operating system or an application program in the nonvolatile memory area. The built-in memory 12 stores data necessary for the processor 11 to execute processing for controlling each unit in the volatile memory area. The built-in memory 12 uses the volatile memory area as a work area in which data is appropriately rewritten by the processor 11. The nonvolatile memory area is, for example, a read only memory (ROM). The volatile memory area is, for example, a random access memory (RAM).

The external memory 13 corresponds to an auxiliary storage part of the computer. For example, an SD memory card, a USB memory, or the like can be the external memory 13. The external memory 13 stores data used when the processor 11 performs various types of processing, data generated by the processing of the processor 11, and the like. The external memory 13 may store the application program described above.

The touch panel 14 is a device that includes both an input device and a display device of the user terminal 10. The touch panel 14 detects a touch position on the displayed image and outputs the touch position information to the processor 11.

The camera 15 is an imaging device built in the user terminal 10. The camera 15 operates as a photographing device of a still image or moving image, or a scanning device of a data code such as a barcode or a two-dimensional code by an application program installed in the user terminal 10. The camera 15 is an example of a code reader.

The wireless unit 16 is a circuit for performing data communication with the access point 90 according to a wireless LAN communication protocol.

The communication interface 17 is a circuit for performing data communication with an external device connected via the Internet or a mobile communication network.

The user terminal 10 having such a configuration stores a shopping support application program used when shopping at a store where the shopping support system 1 is introduced, as an application program stored in the built-in memory 12 or the external memory 13. Hereinafter, the shopping support application program is referred to as a shopping support application. The method for installing the shopping support application in the built-in memory 12 or the external memory 13 is not particularly limited. The shopping support application can be installed in the built-in memory 12 or the external memory 13 by recording a control program on a removable recording medium or distributing the control program by communication via a network. The recording medium is not limited as long as the recording medium can store a program, such as an SD memory card or a USB memory, and can be read by a device.

The user terminal 10 stores a terminal ID in a nonvolatile memory area in the built-in memory 12. The terminal ID is terminal identification data set for each user terminal 10 to identify each user terminal 10 individually.

The user terminal 10 stores identification data (e.g., a member ID) in the external memory 13.

The member ID is a unique code assigned to each member to identify the member. A member is a purchaser who installed a shopping support application to use the shopping support system 1 and registered as a member. When the shopping support application starts on the user terminal 10, a barcode or a two-dimensional code representing the member ID is displayed on the touch panel 14 of the user terminal 10.

Figure 3:
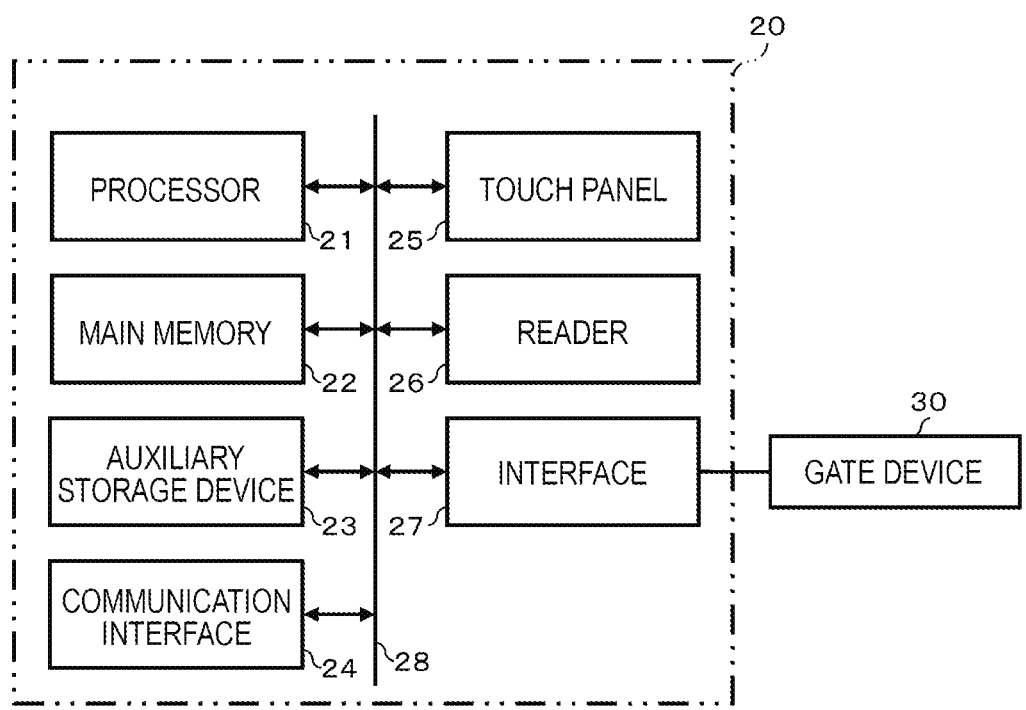
FIG. 3 is a block diagram showing a main part circuit configuration of a check-in device shown in FIG. 1.

FIG. 3 is a block diagram showing a main part circuit configuration of the check-in device 20.

The check-in device 20 includes a processor 21, a main memory 22, an auxiliary storage device 23, a communication interface 24, a touch panel 25, a reader 26, an interface 27, and a system transmission line 28.

The system transmission line 28 includes an address bus, a data bus, a control signal line, and the like. In the check-in device 20, the processor 21, the main memory 22, the auxiliary storage device 23, the communication interface 24, the touch panel 25, the reader 26, and the interface 27 are connected to the system transmission line 28. The processor 21, the main memory 22, and the auxiliary storage device 23 are connected by the system transmission line 28 to configure a computer that performs information processing for controlling the check-in device 20.

The processor 21 corresponds to a central part of the computer. The processor 21 controls each unit to realize various functions as the check-in device 20 according to an operating system or an application program. The processor 21 is, for example, a CPU.

The main memory 22 corresponds to a main storage part of the computer. The main memory 22 includes a nonvolatile memory area and a volatile memory area. The main memory 22 stores an operating system or an application program in the nonvolatile memory area. The main memory 22 stores data necessary for the processor 21 to execute processing for controlling each unit in the volatile memory area. The main memory 22 uses the volatile memory area as a work area in which data is appropriately rewritten by the processor 21. The nonvolatile memory area is, for example, a ROM. The volatile memory area is, for example, a RAM.

The auxiliary storage device 23 corresponds to an auxiliary storage part of the computer. As the auxiliary storage device 23, a known storage device such as an electric erasable programmable read-only memory (EEPROM), a hard disc drive (HDD), or a solid state drive (SSD) is used alone or in combination. The auxiliary storage device 23 stores data used when the processor 21 performs various types of processing and data generated by the processing performed by the processor 21. The auxiliary storage device 23 may store an application program.

The application program stored in the main memory 22 or the auxiliary storage device 23 includes a control program describing information processing performed by the check-in device 20. The method for installing the control program in the main memory 22 or the auxiliary storage device 23 is not particularly limited. The control program can be installed in the main memory 22 or the auxiliary storage device 23 by recording the control program on a removable recording medium, or distributing the control program by communication via a network. The recording medium may be in any form as long as the recording medium can store a program, such as a CD-ROM or a memory card, and can be read by a device.

The communication interface 24 is a circuit for performing data communication with a device connected via the communication network 100. The check-in device 20 mainly performs data communication with the store server 40 via the communication network 100.

The touch panel 25 displays a screen for presenting various pieces of information to the operator. The touch panel 25 inputs data specified by a touch operation of the operator. In most cases, the operator of the check-in device 20 is a purchaser. However, a clerk may be the operator.

The reader 26 reads the barcode of the member ID presented by the purchaser. As described above, the member ID is displayed on the touch panel 14 when the shopping support application starts on the user terminal 10 of the purchaser. The reader 26 reads the member ID displayed on the touch panel 14. In the present embodiment, the operation of the purchaser causing the reader to read the member ID displayed on the touch panel 14 is called a check-in operation. As the reader 26, for example, an optical two-dimensional barcode reader is used.

The gate device 30 is connected to the interface 27. The interface 27 outputs a data signal for an opening command, a closing command, and the like sent from the processor 21 to the gate device 30.

Figures 4, 5:
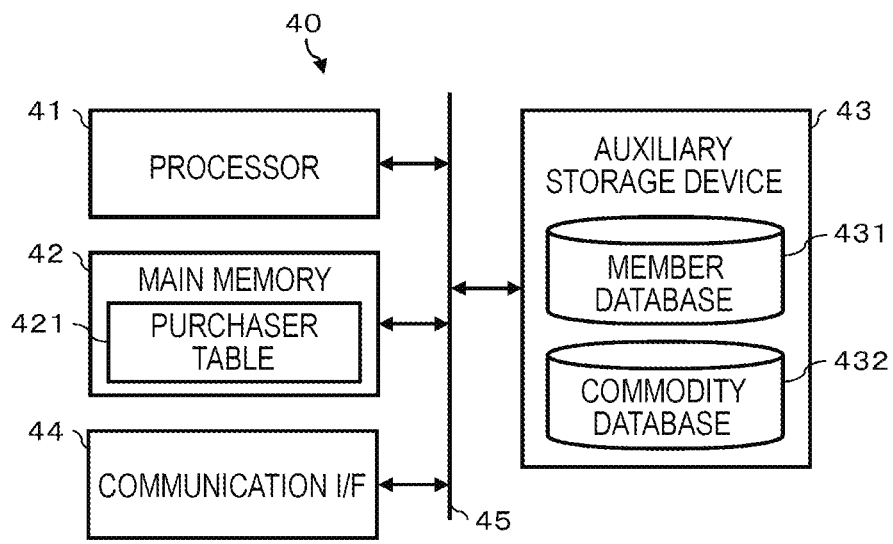
FIG. 4 is a block diagram showing a main part circuit configuration of a store server shown in FIG. 1.
FIG. 5 is a schematic diagram showing a data structure of a purchaser table shown in FIG. 4.

FIG. 4 is a block diagram showing a main part circuit configuration of the store server 40. The store server 40 includes a processor 41, a main memory 42, an auxiliary storage device 43, a communication interface 44, and a system transmission line 45.

The system transmission line 45 includes an address bus, a data bus, a control signal line, and the like. In the store server 40, the processor 41, the main memory 42, the auxiliary storage device 43, and the communication interface 44 are connected to the system transmission line 45. The processor 41, the main memory 42, and the auxiliary storage device 43 are connected by the system transmission line 45 to configure a computer that performs information processing for controlling the store server 40.

The processor 41 corresponds to a central part of the computer. The processor 41 controls each unit to realize various functions as the store server 40 according to an operating system or an application program. The processor 41 is, for example, a CPU.

The main memory 42 corresponds to a main storage part of the computer. The main memory 42 includes a nonvolatile memory area and a volatile memory area. The main memory 42 stores an operating system or an application program in the nonvolatile memory area. The main memory 42 stores data necessary for the processor 41 to execute processing for controlling each unit in the volatile memory area. The main memory 42 uses the volatile memory area as a work area in which data is appropriately rewritten by the processor 41. The nonvolatile memory area is, for example, a ROM. The volatile memory area is, for example, a RAM.

The auxiliary storage device 43 corresponds to an auxiliary storage part of the computer. As the auxiliary storage device 43, for example, a known storage device such as an EEPROM, an HDD, or an SSD is used alone or in combination. The auxiliary storage device 43 stores data used when the processor 41 performs various types of processing and data generated by the processing performed by the processor 41. The auxiliary storage device 43 may store an application program.

The application program stored in the main memory 42 or the auxiliary storage device 43 includes a control program describing information processing executed by the store server 40. The method for installing the control program in the main memory 42 or the auxiliary storage device 43 is not particularly limited. The control program can be installed in the main memory 42 or the auxiliary storage device 43 by recording the control program on a removable recording medium, or distributing the control program by communication via a network. The recording medium may be in any form as long as the recording medium can store a program, such as a CD-ROM or a memory card, and can be read by a device.

The communication interface 44 is a circuit for performing data communication with a device connected via the communication network 100. The store server 40 performs data communication with the check-in device 20, the virtual POS server 50, the action monitoring device 70, and the checkout device 80 via the communication network 100. The store server 40 can perform data communication with the user terminal 10 used by the purchaser via the access point 90 connected to the communication network 100.

The store server 40 having such a configuration stores a purchaser table 421 in a volatile memory area in the main memory 42. The data structure of the purchaser table 421 is shown in the schematic diagram of FIG. 5. As shown in the drawing, the purchaser table 421 has a data structure for storing a member ID, a terminal ID, and a tracking ID in association with each other. The tracking ID will be described later in the operation description.

The store server 40 stores a member database 431 and a commodity database 432 in the auxiliary storage device 43. The member database 431 stores a member data record created for each purchaser who registered as a member of the shopping support application. The member data record includes items of a member ID and a terminal ID. The member ID is generated when the purchaser installs the shopping support application on the user terminal 10 and registers as a member. The terminal ID is acquired from the user terminal 10 at the time of membership registration of the shopping support application. The commodity database 432 stores commodity data records describing data of commodities sold in the store. The commodity data record includes items of a commodity code, a price, and a commodity name. The commodity code is commodity identification data set for each commodity to identify each commodity. Each commodity is usually provided with a barcode representing a commodity code. It is needless to say that the member data record and the commodity data record may include items other than the above-described items.

Figure 6:
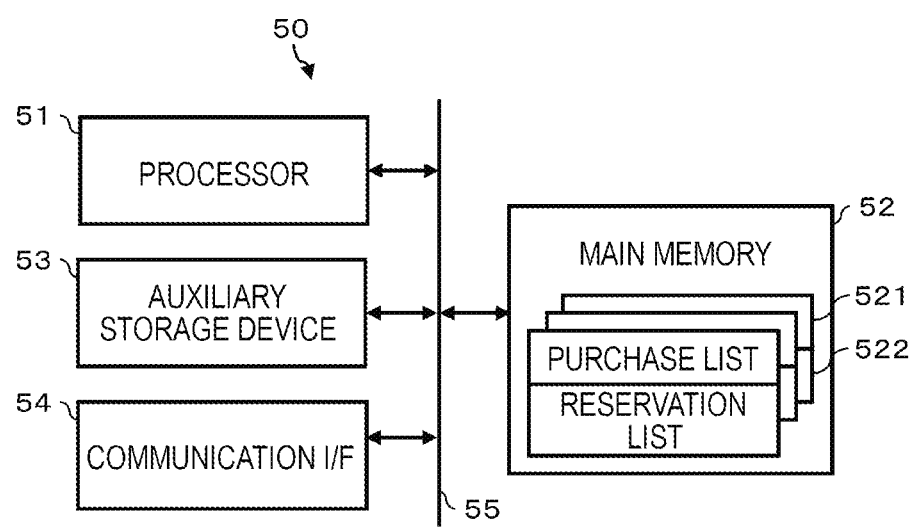
FIG. 6 is a block diagram showing a main part circuit configuration of a virtual POS server shown in FIG. 1.

FIG. 6 is a block diagram showing a main part circuit configuration of the virtual POS server 50. The virtual POS server 50 includes a processor 51, a main memory 52, an auxiliary storage device 53, a communication interface 54, and a system transmission line 55.

The system transmission line 55 includes an address bus, a data bus, a control signal line, and the like. In the virtual POS server 50, the processor 51, the main memory 52, the auxiliary storage device 53, and the communication interface 54 are connected to the system transmission line 55. The processor 51, the main memory 52, and the auxiliary storage device 53 are connected by the system transmission line 55 to configure a computer that performs information processing for controlling the virtual POS server 50.

The processor 51 corresponds to a central part of the computer. The processor 51 controls each unit to realize various functions as the virtual POS server 50 according to an operating system or an application program. The processor 51 is, for example, a CPU.

The main memory 52 corresponds to a main storage part of the computer. The main memory 52 includes a nonvolatile memory area and a volatile memory area. The main memory 52 stores an operating system or an application program in the nonvolatile memory area. The main memory 52 stores data necessary for the processor 51 to execute processing for controlling each unit in the volatile memory area. The main memory 52 uses the volatile memory area as a work area in which data is appropriately rewritten by the processor 51. The nonvolatile memory area is, for example, a ROM. The volatile memory area is, for example, a RAM.

The auxiliary storage device 53 corresponds to an auxiliary storage part of the computer. As the auxiliary storage device 53, a known storage device such as an EEPROM, an HDD, or an SSD is used alone or in combination. The auxiliary storage device 53 stores data used when the processor 51 performs various types of processing and data generated by the processing of the processor 51. The auxiliary storage device 53 may store an application program.

The application program stored in the main memory 52 or the auxiliary storage device 53 includes a control program describing information processing executed by the virtual POS server 50. The method for installing the control program in the main memory 52 or the auxiliary storage device 53 is not particularly limited. The control program can be installed in the main memory 52 or the auxiliary storage device 53 by recording the control program on a removable recording medium or distributing the control program by communication via a network. The recording medium may be in any form as long as the recording medium can store a program, such as a CD-ROM or a memory card, and can be read by a device.

The communication interface 54 is a circuit for performing data communication with a device connected via the communication network 100. The virtual POS server 50 mainly performs data communication with the store server 40 via the communication network 100.

In the virtual POS server 50 having such a configuration, a part of the volatile memory area in the main memory 52 is used as an area for creating a purchase list 521 and a reservation list 522. The purchase list 521 and the reservation list 522 are created for each user terminal 10 communicably connected to the store server 40. The purchase list 521 is a list for storing a commodity code of a commodity purchased by a purchaser who is a user of the user terminal 10 in association with the member ID of the purchaser. The reservation list 522 is a list for storing a commodity code of a commodity that was postponed at the time of shopping around in association with the member ID of the purchaser, since the purchaser determined that it is better to put the commodity, such as a frozen food, a refrigerated food, a large and bulky commodity, or the like, in the shopping cart immediately before checkout. In the following, a commodity that was postponed by the purchaser at the time of shopping around is referred to as a postponed target commodity.

Figure 7:
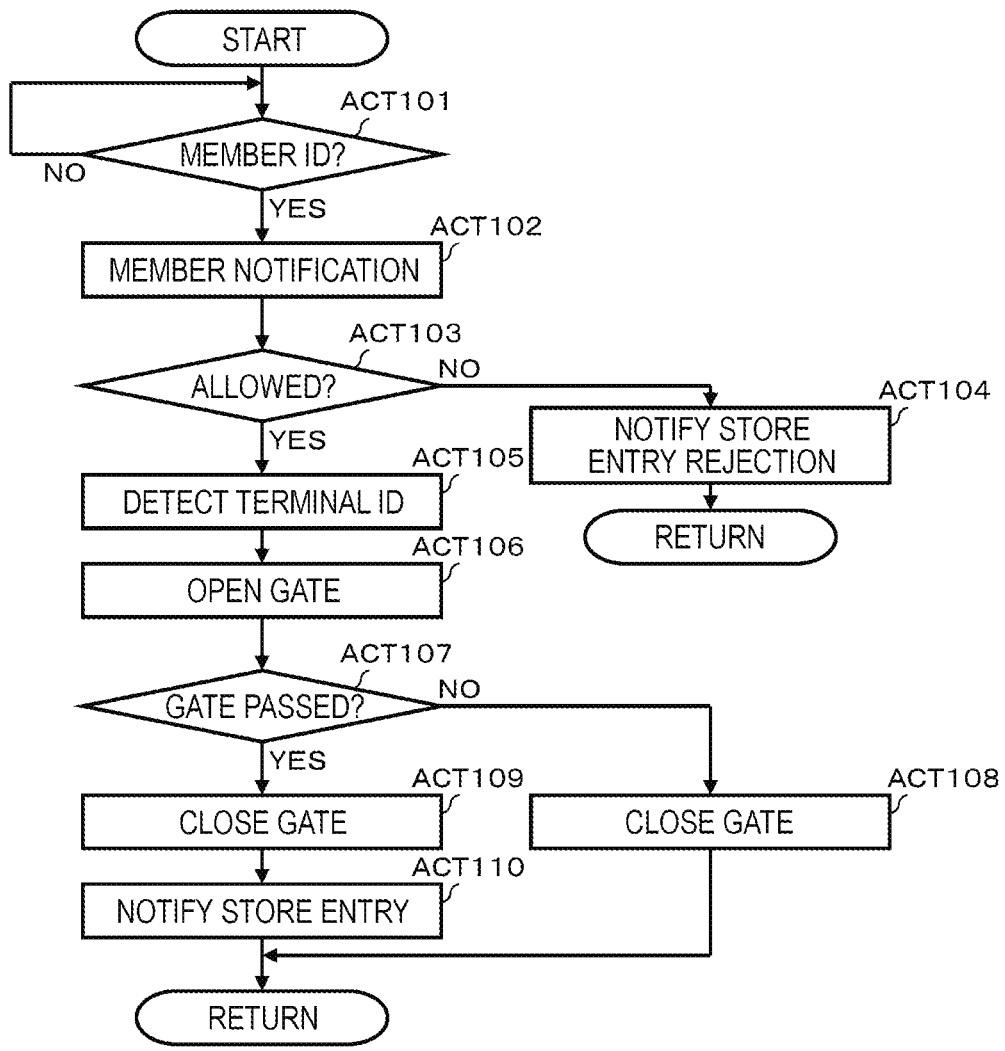
FIG. 7 is a flowchart showing check-in processing of a processor in the check-in device.

FIG. 7 is a flowchart showing a main procedure of the check-in processing executed by the processor 21 of the check-in device 20. FIGS. 8 to 13 are flowcharts showing the main part procedures of main processing executed by the processor 41 of the store server 40 according to a control program. FIG. 14 is a flowchart showing a main part procedure of main processing executed by the processor 51 of the virtual POS server 50 according to a control program. Hereinafter, the operation of the shopping support system 1 will be described with reference to the drawings. The description of the operation illustrates the shopping support method of at least one embodiment. The procedures and the contents of the operation described below are merely examples. The procedures and contents are not limited as long as similar results are obtained.

First, the processor 21 of the check-in device 20 waits for the input of the member ID, as ACT 101 in FIG. 7. When the purchaser performs a check-in operation at the entrance of the store, the member ID of the purchaser is input, and thus the processor 21 determines YES in ACT 101 and proceeds to ACT 102. The processor 21 controls the communication interface 24 to send a member notification to the store server 40, as ACT 102. With this control, a member notification command is transmitted from the communication interface 24 to the store server 40 via the communication network 100. The member notification command includes the member ID input by the check-in operation.

Figure 8:
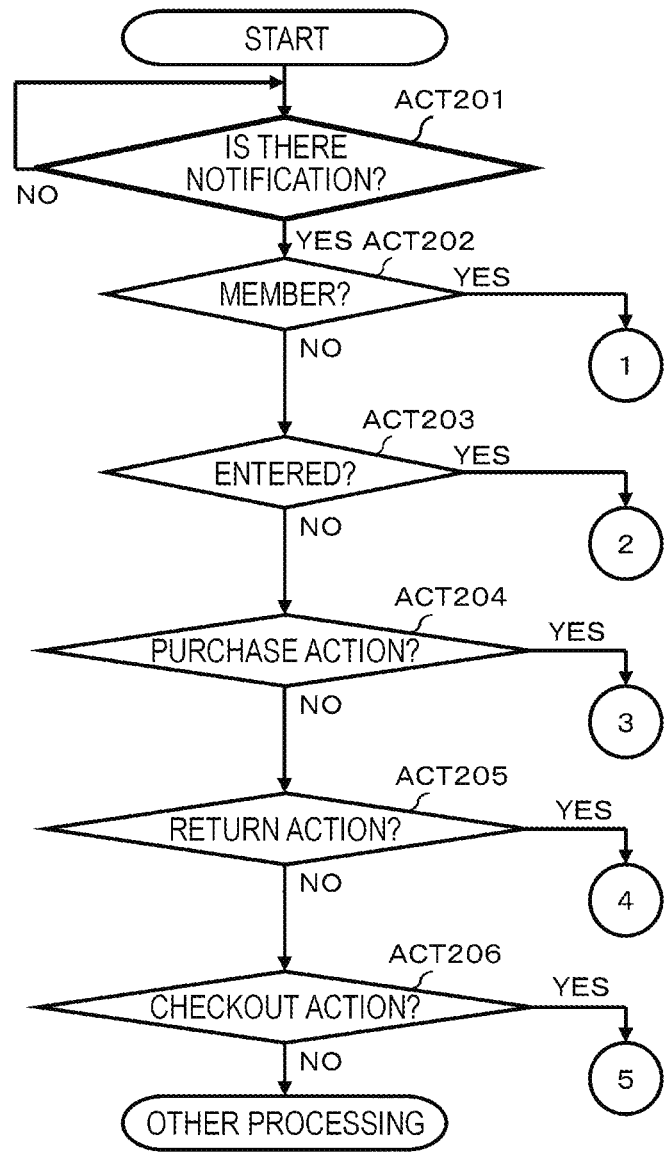
FIG. 8 is a flowchart showing a main part control procedure of a processor in the store server.
Figure 9:
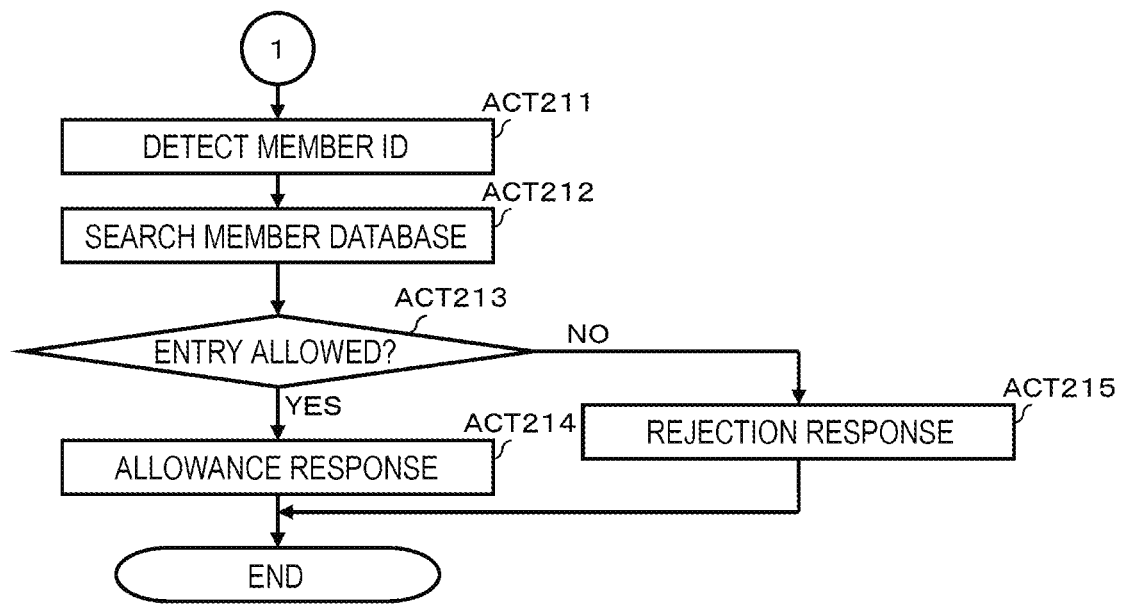
FIG. 9 is a flowchart showing the main part control procedure of the processor in the store server.

The processor 41 of the store server 40 waits for a notification command, as ACT 201 in FIG. 8. Upon receiving the notification command via the communication interface 44, the processor 41 determines YES in ACT 201 and proceeds to ACT 202. The processor 41 checks whether the notification command received is a member notification command, as ACT 202. In this case, since the member notification command was received, the processor 41 determines YES in ACT 202 and proceeds to ACT 211 in FIG. 9.

The processor 41 detects the member ID from the member notification command, as ACT 211. When the member ID is detected, the processor 41 searches the member database 431 with the member ID and acquires a member data record associated with the member ID, as ACT 212. The processor 41 checks whether entry into the store is to be allowed, as ACT 213. For example, when the member data record cannot be obtained from the member database 431, the processor 41 determines that entry into the store is to be rejected. When the member data record can be obtained from the member database 431, the processor 41 determines that entry into the store is to be allowed.

When the entry into the store is allowed, the processor 41 determines YES in ACT 213 and proceeds to ACT 214. The processor 41 controls the communication interface 44 to return an allowance response, as ACT 214. On the other hand, when the entry into the store is rejected, the processor 41 determines NO in ACT 213 and proceeds to ACT 215. The processor 41 controls the communication interface 44 to return a rejection response, as ACT 215. With such controls, an allowance response command or a rejection response command is transmitted from the communication interface 44 to the check-in device 20 via the communication network 100. The allowance response command includes the terminal ID of the member data record acquired from the member database 431. As described above, the processor 41 ends the reception processing of the member notification command.

Referring back to the description of FIG. 7, the processor 21 of the check-in device 20 that controlled the transmission of the member notification command waits for an allowance response command, as ACT 103. Here, when a rejection response command is received from the store server 40, the processor 21 determines NO in ACT 103 and proceeds to ACT 104. The processor 21 controls the touch panel 25 to inform that entry into the store is rejected, as ACT 104. With such control, the touch panel 25 informs the purchaser who performed the check-in operation of the fact that entry into the store is rejected by display or sound. As described above, the processor 21 ends the information processing of the procedure illustrated in the flowchart of FIG. 7.

On the other hand, if the processor 21 received an allowance response command from the store server 40 in ACT 103, the processor 21 determines YES and proceeds to ACT 105. The processor 21 detects the terminal ID from the allowance response command, as ACT 105. Then, the processor 21 temporarily stores the terminal ID in the main memory 22. The processor 21 controls the gate device 30 to open the gate, as ACT 106. With such control, the gate of the gate device 30 is opened. By opening the gate, the purchaser who performed the check-in operation can enter the store. The purchaser enters the store through the open gate.

The processor 21 that controlled the opening of the gate checks whether the purchaser passed through the gate, as ACT 107. Here, when the passage of the purchaser is not detected in the gate device 30, the processor 21 determines NO in ACT 107 and proceeds to ACT 108. The processor 21 controls the gate device 30 to close the gate, as ACT 108. With such control, the gate in the gate device 30 is closed.

When the passage of the purchaser is detected by the gate device 30, the processor 21 determines YES in ACT 107 and proceeds to ACT 109. The processor 21 controls the gate device 30 to close the gate, as ACT 109. With this control, the gate in the gate device 30 is closed. Closing the gate prevents the next purchaser from entering the store.

The processor 21 that controlled the closing of the gate controls the communication interface 24 to send a store entry notification to the store server 40, as ACT 110. With such control, a store entry notification command is transmitted from the communication interface 24 to the store server 40 via the communication network 100. The store entry notification command includes the member ID input by the check-in operation and the terminal ID temporarily stored in the main memory 22. As described above, the processor 21 ends the information processing of the procedure illustrated in the flowchart of FIG. 7.

When the processor 41 of the store server 40 detects that the notification command was received in ACT 201 of FIG. 8 and confirms that the notification command is not a member notification command in ACT 202, the processor 41 determines NO and proceeds to ACT 203. The processor 41 checks whether the notification command is a store entry notification command, as ACT 203. Here, since the store entry notification command was received, the processor determines YES in ACT 203 and proceeds to ACT 221 in FIG. 10.

The processor 41 detects the member ID and the terminal ID from the store entry notification command, as ACT 221. The processor 41 acquires a unique ID generated for identifying the purchaser, as ACT 222. Hereinafter, the unique ID is referred to as a tracking ID. The processor 41 stores the acquired tracking ID in the purchaser table 421 in association with the member ID and the terminal ID detected from the store entry notification command, as ACT 223.

The processor 41 controls the communication interface 44 to instruct the action monitoring device 70 to start tracking, as ACT 224. With such control, a tracking start command is transmitted from the communication interface 44 to the action monitoring device 70 via the communication network 100. The tracking start command includes the tracking ID acquired in the process of ACT 222. The action monitoring device 70 identifies the purchaser allowed to enter the store by the tracking ID.

The processor 41 controls the communication interface 44 to send a list creation notification to the virtual POS server 50, as ACT 225. The list is the purchase list 521 and the reservation list 522. With such control, a list creation notification command is transmitted from the communication interface 44 to the virtual POS server 50 via the communication network 100. The list creation notification command includes the member ID detected from the store entry notification command. As described above, the processor 41 ends the reception processing of the store entry notification command.

The processor 51 of the virtual POS server 50 waits for a notification command as ACT 301 in FIG. 14. Upon receiving the notification command via the communication interface 54, the processor 51 determines YES in ACT 301 and proceeds to ACT 302. The processor 51 checks whether the notification command received as ACT 302 is a list creation notification command. Here, since the list creation notification command was received, the processor 51 determines YES in ACT 302 and proceeds to ACT 303.

The processor 51 creates the purchase list 521 and the reservation list 522 in the main memory 52, as ACT 303. Then, the processor 51 registers the member ID included in the list creation notification command in the purchase list 521 and the reservation list 522, respectively, as ACT 304. As described above, the processor 51 ends the information processing of the procedure shown in the flowchart of FIG. 14.

Now, the purchaser who entered the store after passing through the gate goes around the store with a shopping cart, for example. Then, when finding a commodity to be purchased, the purchaser picks up the commodity from the sales floor and puts the commodity in the shopping cart. On the other hand, the purchaser returns a community, such as a frozen food, a refrigerated food, and a large and bulky commodity, which was picked up but postponed purchase since it is better to put the commodity in the shopping cart immediately before checkout, a so-called postponed target commodity, to the sales floor. Then, immediately before checkout, the purchaser picks up the postponed target commodity again and puts the commodity in the shopping cart. When the purchase is completed, the purchaser moves to the checkout place where the checkout device 80 is installed and performs settlement of the price.

Such actions of the purchaser are all monitored by the action monitoring device 70. As described above, when the action monitoring device 70 detects the action of the purchaser picking up the commodity from the sales floor and putting the commodity in the shopping cart, that is, the purchase action, a purchase action notification command is output from the action monitoring device 70 to the store server 40. The purchase action notification command includes the tracking ID for identifying the purchaser and the commodity code of the commodity put in the shopping cart.

When the processor 41 of the store server 40 detects that the notification command was received in ACT 201 of FIG. 8 and confirms that the notification command is not a store entry notification command in ACT 203, the processor 41 determines NO and proceeds to ACT 204. The processor 41 checks whether the notification command is a purchase action notification command, as ACT 204. Here, since the purchase action notification command was received, the processor 41 determines YES in ACT 204 and proceeds to ACT 231 in FIG. 11.

The processor 41 detects the tracking ID from the purchase action notification command, as ACT 231. Then, the processor 41 refers to the purchaser table 421 and acquires the member ID specified by the tracking ID, as ACT 232. The processor 41 acquires the commodity code from the purchase action notification command, as ACT 233. Then, the processor 41 controls the communication interface 44 to send a purchase notification to the virtual POS server 50, as ACT 234. With such control, a purchase notification command is transmitted from the communication interface 44 to the virtual POS server 50 via the communication network 100. The purchase notification command includes the member ID acquired in the process of ACT 232 and the commodity code acquired in the process of ACT 233. As described above, the processor 41 ends the information processing of the procedure shown in the flowchart of FIG. 11.

When the processor 51 of the virtual POS server 50 detects that the notification command was received in ACT 301 of FIG. 14 and confirms that the notification command is not a list creation notification command in ACT 302, the processor 51 determines NO and proceeds to ACT 305. The processor 51 checks whether the notification command is a purchase notification command, as ACT 305. Here, since the purchase notification command was received, the processor 51 determines YES in ACT 305 and proceeds to ACT 306. The processor 51 updates the purchase list 521, as ACT 306. Specifically, the processor 51 registers the commodity code included in the same purchase notification command in the purchase list 521 in which the member ID included in the purchase notification command was registered. As described above, the processor 51 ends the information processing of the procedure shown in the flowchart of FIG. 14.

As described above, when the action monitoring device 70 detects the action of returning the commodity picked up by the purchaser to the sales floor, that is, the return action, the action monitoring device 70 outputs a return action notification command to the store server 40. The return action notification command includes the tracking ID for identifying the purchaser and the commodity code of the commodity returned to the sales floor, a so-called returned commodity.

When the processor 41 of the store server 40 detects that the notification command was received in ACT 201 of FIG. 8 and confirms that the notification command is not a purchase action notification command in ACT 204, the processor 41 determines NO and proceeds to ACT 205. The processor 41 checks whether the notification command is a return action notification command, as ACT 205. Here, since the return action notification command was received, the processor 41 determines YES in ACT 205 and proceeds to ACT 241 in FIG. 12.

The processor 41 detects the tracking ID from the return action notification command, as ACT 241. Then, the processor 41 refers to the purchaser table 421 and acquires the member ID and the terminal ID specified by the tracking ID, as ACT 242. The processor 41 acquires the commodity code from the return action notification command, as ACT 243. Then, the processor 41 searches the commodity database 432 and acquires commodity data including the commodity name and price from the commodity data record including the commodity code acquired in the process of ACT 243, as ACT 244.

The processor 41 controls the communication interface 44 to make a reservation inquiry to the user terminal 10, as ACT 245. With such control, a reservation inquiry command is transmitted from the communication interface 44 to the user terminal 10 via the communication network 100. The reservation inquiry command includes the terminal ID acquired in the process of ACT 242 and the commodity data acquired in the process of ACT 243.

The reservation inquiry command is wirelessly transmitted via the access point 90. Then, the reservation inquiry command is received by the wireless unit 16 of the user terminal 10 in which the terminal ID included in the command is set. In the user terminal 10 that received the reservation inquiry command, a reservation inquiry screen SC1 (see FIG. 15) is displayed on the touch panel 14.

Figure 15:
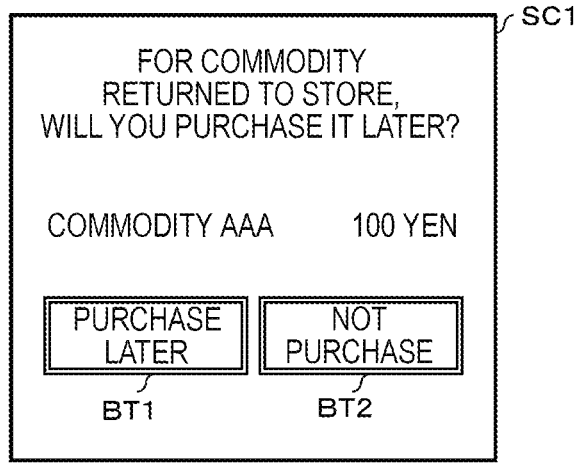
FIG. 15 is a schematic diagram showing an example of a reservation inquiry screen displayed on a user terminal.

FIG. 15 is an example of the reservation inquiry screen SC1. As shown in FIG. 15, on the reservation inquiry screen SC1, a message for inquiring that the returned commodity is to be purchased later as a postponed target commodity, the commodity name and price of the commodity data included in the reservation inquiry command, and an image of a "purchase later" button BT1 and an image of a "not purchase" button BT2 are displayed. The "purchase later" button BT1 is input when the purchaser purchases the returned commodity later as a postponed target commodity. The "not purchase" button BT2 is input when the purchaser does not purchase the returned commodity. When the "purchase later" button BT1 is input, a reservation command is wirelessly transmitted from the user terminal 10 to the store server 40. When the "not purchase" button BT2 is input, a no-reservation command is wirelessly transmitted from the user terminal 10 to the store server 40. The reservation command or the no-reservation command is received at the access point 90 and sent to the store server 40 via the communication network 100. The content of the message displayed in FIG. 15 is an example. Any content may be used as long as the content is an inquiry to the purchaser as to whether to purchase the postponed target commodity.

Figure 12:
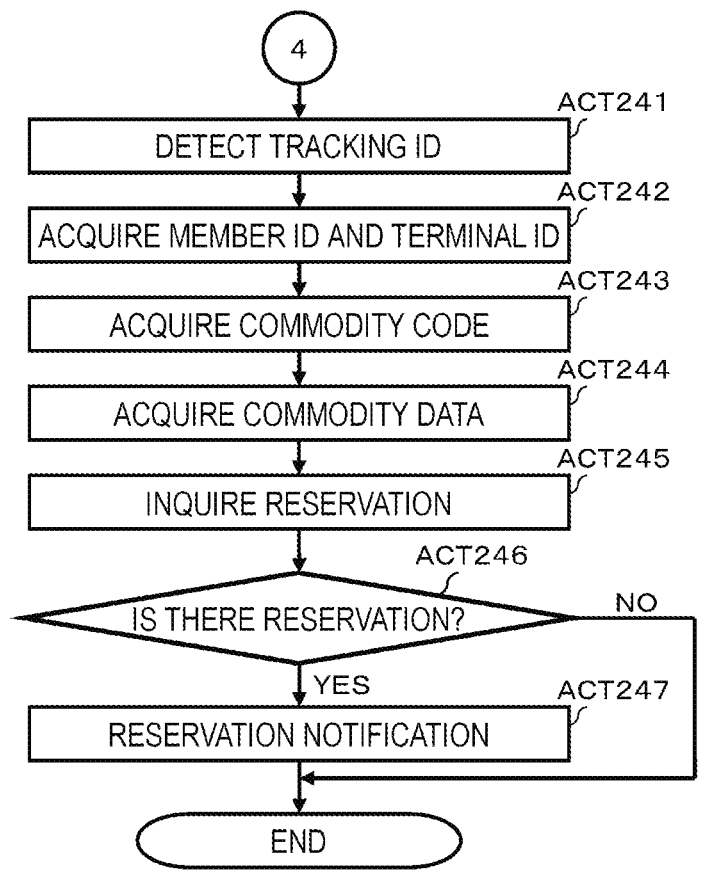
FIG. 12 is a flowchart showing the main part control procedure of the processor in the store server.

Referring back to the description of FIG. 12, the processor 41 that controlled the transmission of the reservation inquiry command waits for a reservation command, as ACT 246. Here, when a no-reservation command is received via the communication interface 44, the processor 41 determines NO in ACT 246 and ends the information processing of the procedure shown in the flowchart of FIG. 12.

When a reservation command is received, the processor 41 determines YES in ACT 246 and proceeds to ACT 247. The processor 41 controls the communication interface 44 to send a reservation notification to the virtual POS server 50, as ACT 247. With such control, a reservation notification command is transmitted from the communication interface 44 to the virtual POS server 50 via the communication network 100. The reservation notification command includes the member ID acquired in the process of ACT 242 and the commodity code acquired in the process of ACT 243.

When the processor 51 of the virtual POS server 50 detects that the notification command was received in ACT 301 of FIG. 14 and confirms that the notification command is not a purchase notification command in ACT 305, the processor 51 determines NO and proceeds to ACT 307. The processor 51 checks whether the notification command is a reservation notification command, as ACT 307. Here, since the reservation notification command was received, the processor 51 determines YES in ACT 307 and proceeds to ACT 308. The processor 51 updates the reservation list 522, as ACT 308. Specifically, the processor 51 registers the commodity code included in the reservation notification command in the reservation list 522 in which the member ID included in the same reservation notification command was registered. As described above, the processor 51 ends the information processing of the procedure shown in the flowchart of FIG. 14.

As described above, when the action monitoring device 70 detects the action of the purchaser moving to the checkout place, that is, the checkout action, the action monitoring device 70 outputs a checkout action notification command to the store server 40. The checkout action notification command includes the tracking ID for identifying the purchaser. The checkout action notification command is an example of a checkout initiation command that indicates that the purchaser is ready to begin checkout of one or more commodities.

When the processor 41 of the store server 40 detects that the notification command was received in ACT 201 of FIG. 8 and confirms that the notification command is not a return action notification command in ACT 205, the processor 41 determines NO and proceeds ACT 206. The processor 41 checks whether the received command is a checkout action notification command, as ACT 206. Here, since the checkout action notification command was received, the processor 41 determines YES in ACT 206 and proceeds to ACT 251 in FIG. 13.

The processor 41 detects the tracking ID from the checkout action notification command, as ACT 251. Then, the processor 41 refers to the purchaser table 421 and acquires the member ID and the terminal ID specified by the tracking ID, as ACT 252.

The processor 41 selects the purchase list 521 and the reservation list 522 in which the member ID acquired in the process of ACT 252 was registered, as ACT 253. Then, the processor 41 checks whether there is a reservation, that is, whether the commodity code was registered in the reservation list 522, as ACT 254. When there is no reservation, that is, when the commodity code was not registered in the reservation list 522, the processor 41 determines NO in ACT 254 and proceeds to ACT 262. The process of ACT 262 will be described later.

When there is a reservation, that is, when the commodity code was registered in the reservation list 522, the processor 41 determines YES in ACT 254 and proceeds to ACT 255. The processor 41 searches the purchase list 521, as ACT 255. Then, the processor 41 checks whether the user forgot to purchase the reserved commodity, as ACT 256. If all the commodity codes registered in the reservation list 522 are present in the purchase list 521, the processor 41 determines that there is not forgotten purchase. If there is any one of the commodity codes registered in the reservation list 522 and not present in the purchase list 521, the processor 41 determines that there is a forgotten purchase. When there is no forgotten purchase, the processor 41 determines NO in ACT 256 and proceeds to ACT 262.

When there is a forgotten purchase, the processor 41 determines YES in ACT 256 and proceeds to ACT 257. The processor 41 searches the commodity database 432 for the commodity code of a forgotten purchase commodity, that is, the commodity code registered in the reservation list 522 but not registered in the purchase list 521, and acquires the commodity data of the commodity name and price from the commodity data record including the commodity code, as ACT 257. When there are a plurality of commodity codes of the forgotten purchase commodities, the processor 41 acquires the commodity data of the respective commodity names and prices.

The processor 41 controls the communication interface 44 to send a forgotten purchase notification to the user terminal 10, as ACT 258. With such control, a forgotten purchase notification command is transmitted from the communication interface 44 to the user terminal 10 via the communication network 100. The forgotten purchase notification command includes the terminal ID acquired in the process of ACT 252 and the commodity data acquired in the process of ACT 257.

The forgotten purchase notification command is wirelessly transmitted via the access point 90. Then, the forgotten purchase notification command is received by the wireless unit 16 of the user terminal 10 in which the terminal ID included in the command is set. In the user terminal 10 that received the forgotten purchase notification command, a forgotten purchase notification screen SC2 (see FIG. 16) is displayed on the touch panel 14.

Figure 16:
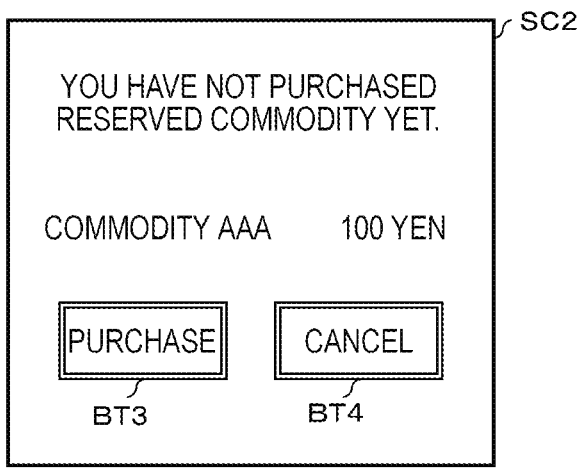
FIG. 16 is a schematic diagram showing an example of a forgotten purchase notification screen displayed on the user terminal.

FIG. 16 is an example of the forgotten purchase notification screen SC2. As shown in FIG. 16, on the forgotten purchase notification screen SC2, a message indicating that the reserved commodity was not purchased, the commodity name and price of the commodity data included in the forgotten purchase notification command, and images of a "purchase" button BT3 and a "cancel" button BT4 are displayed. The "purchase" button BT3 is input to purchase the reserved commodity. The "cancel" button BT4 is input to cancel the purchase of the reserved commodity. When the "purchase" button BT3 is input, a purchase command is wirelessly transmitted from the user terminal 10 to the store server 40. When the "cancel" button BT4 is input, a cancellation command is wirelessly transmitted from the user terminal 10 to the store server 40. The purchase command or the cancellation command is received by the access point 90 and sent to the store server 40 via the communication network 100. The content of the message displayed in FIG. 16 is an example. Any content may be used as long as the content notifies the purchaser that the reserved commodity was not purchased. The recommendation of the related commodity may be displayed on the forgotten purchase notification screen SC2.

Figure 13:
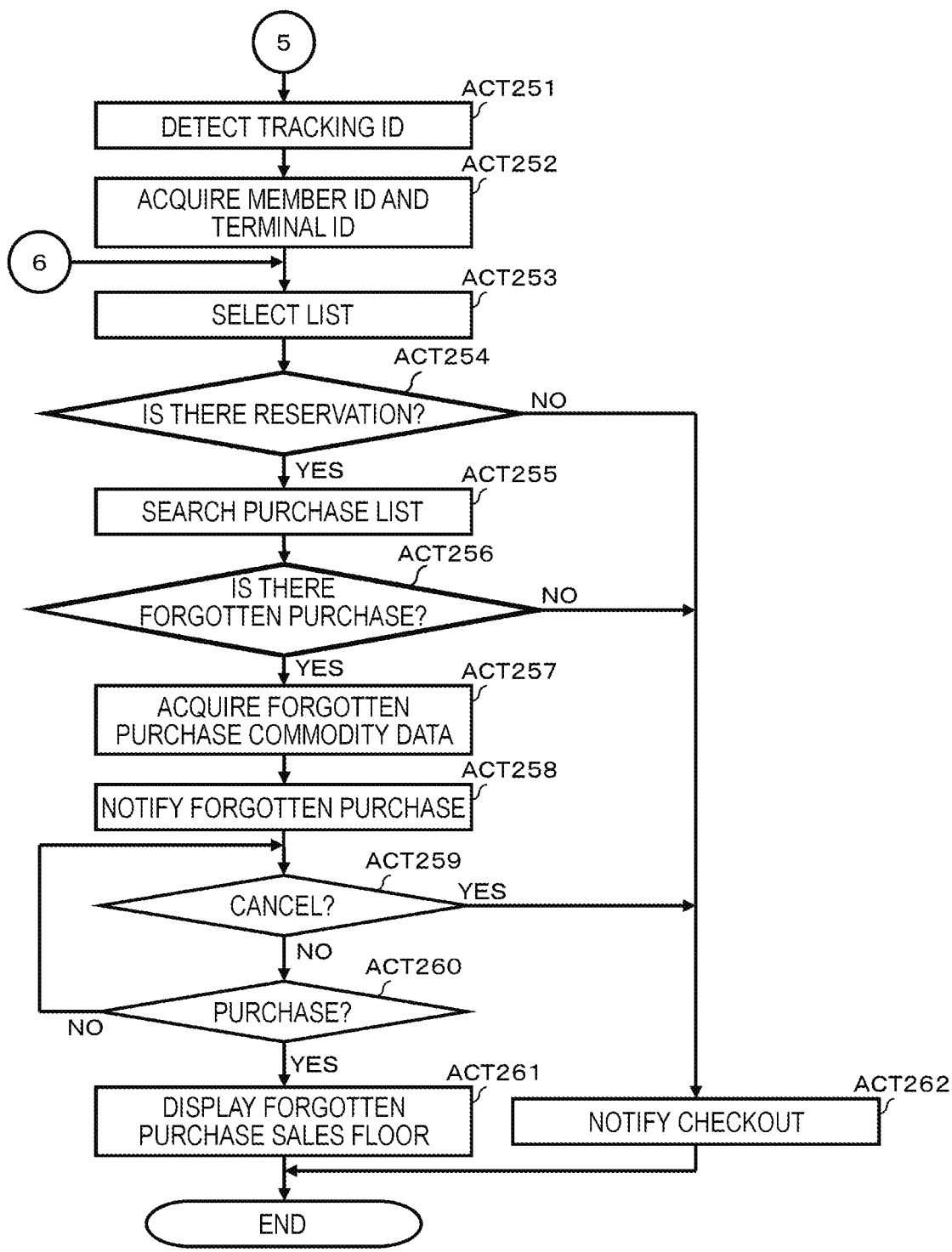
FIG. 13 is a flowchart showing the main part control procedure of the processor in the store server.
Figure 14:
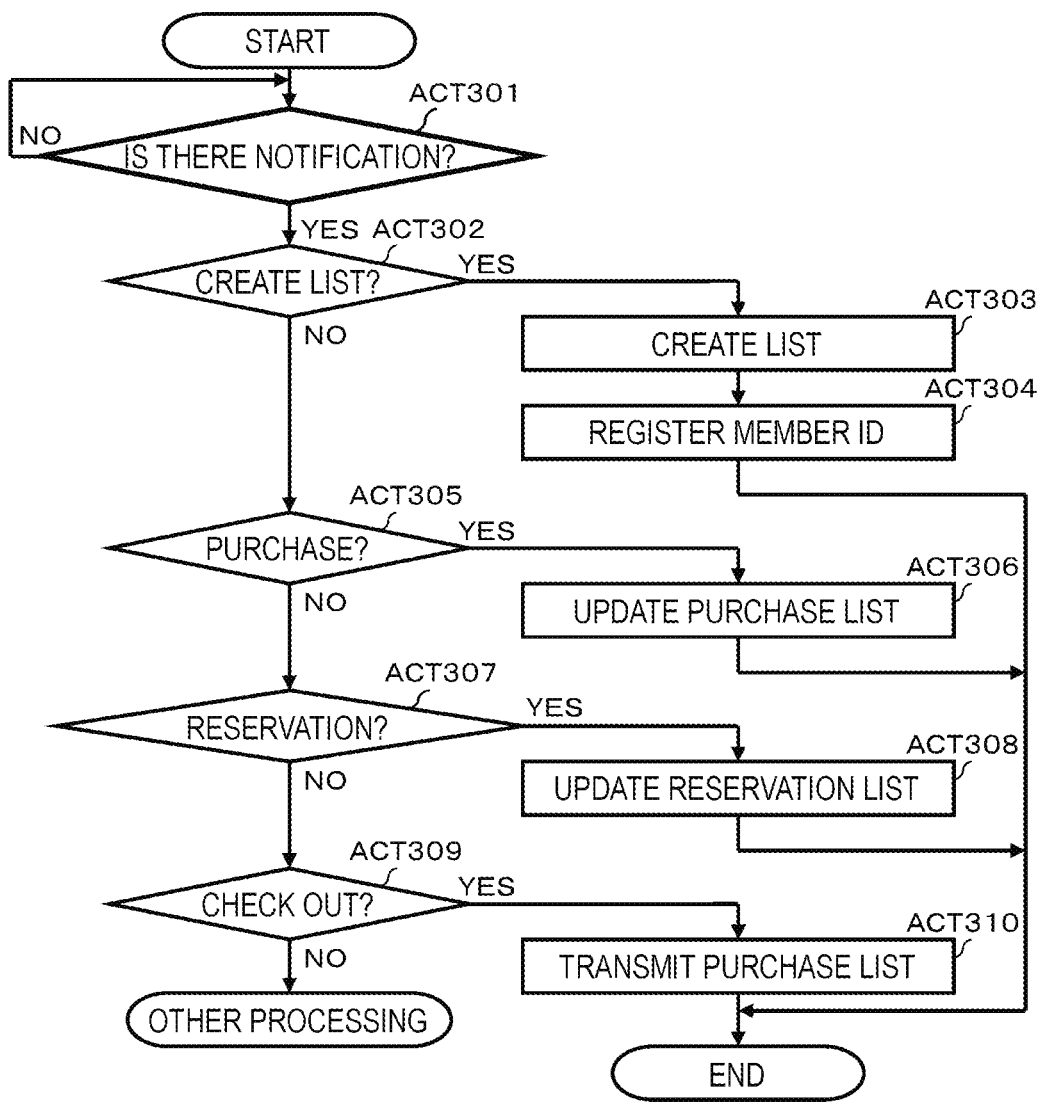
FIG. 14 is a flowchart showing a main part control procedure of a processor in the virtual POS server.

Referring back to the description of FIG. 13, the processor 41 that controlled the transmission of the forgotten purchase notification command checks whether a cancellation command was received, as ACT 259. If a cancellation command was not received, the processor 41 determines NO in ACT 259 and proceeds to ACT 260. The processor 41 checks whether a purchase command was received as ACT 260. If a purchase command was not received, the processor 41 determines NO in ACT 260 and returns to ACT 259.

Here, in ACT 259 or ACT 260, the processor 41 waits to receive a cancellation command or a purchase command. In the standby state, upon receiving a purchase command, the processor 41 determines YES in ACT 260 and proceeds to ACT 261. The processor 41 controls the communication interface 44 to display the sales floor of the forgotten purchase commodity on the user terminal 10, as ACT 261. With such control, a sales floor display command is transmitted from the communication interface 44 to the user terminal 10 via the communication network 100. The sales floor display command includes the terminal ID acquired in the process of ACT 252 and data indicating the sales floor where the forgotten purchase commodity is displayed. The commodity data record of each commodity stored in the commodity database 432 includes a sales floor code for identifying the sales floor where the commodity is displayed. In the auxiliary storage device 43 of the store server 40, map data indicating the sales floor specified by the sales floor code is stored for each sales floor code. The map data specified by the sales floor code of the commodity data record including the commodity code of the forgotten purchase commodity is data indicating the sales floor.

The sales floor display command is wirelessly transmitted via the access point 90. Then, the sales floor display command is received by the wireless unit 16 of the user terminal 10 to which the terminal ID included in the command is set. In the user terminal 10 that received the sales floor display command, a sales floor notification screen SC3 (see FIG. 17) is displayed on the touch panel 14.

Figure 17:
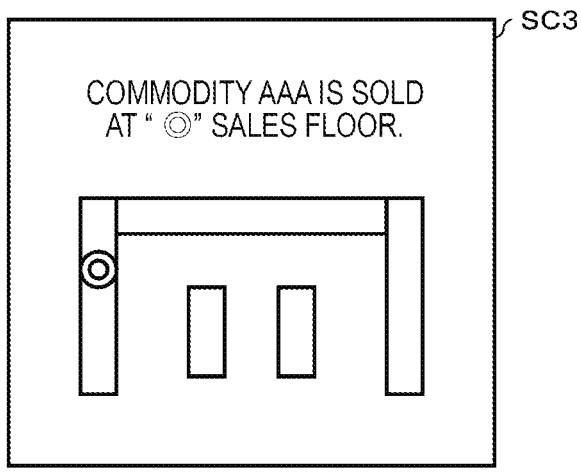
FIG. 17 is a schematic diagram showing an example of a sales floor guide screen displayed on the user terminal.

FIG. 17 is an example of the sales floor notification screen SC3 displayed on the user terminal 10 after the "purchase" button BT3 in FIG. 16 is input. As shown in FIG. 17, on the sales floor notification screen SC3, a message indicating the sales floor of the unpurchased reserved commodity, that is, the postponed target commodity that was forgotten to be purchased, and an in-store map indicating a location of the unpurchased reserved commodity on the sales floor are displayed. The content of the message displayed in FIG. 17 is an example. Any content may be used as long as the content informs the purchaser of the sales floor where the postponed target commodity that was forgotten to be purchased is sold.

Referring back to the description of FIG. 13, if a cancellation command is received in the standby state of ACT 259 or ACT 260, the processor 41 determines NO in ACT 259 and proceeds to ACT 262. That is, when the commodity code of the reservation list 522 is not registered, or when all the commodity codes registered in the reservation list 522 are registered in the purchase list 521, or a cancellation command is received, the processor 41 proceeds to ACT 262.

The processor 41 controls the communication interface 44 to send a checkout notification to the virtual POS server 50, as ACT 262. With such control, a checkout notification command is transmitted from the communication interface 44 to the virtual POS server 50 via the communication network 100. The checkout notification command includes the member ID acquired in the process of ACT 252. As described above, the processor 41 ends the information processing of the procedure shown in the flowchart of FIG. 13.

When the processor 51 of the virtual POS server 50 detects that the notification command was received in ACT 301 of FIG. 14 and confirms that the notification command is not a reservation notification command in ACT 307, the processor 51 determines NO and proceeds to ACT 309. The processor 51 checks whether the notification command is a checkout notification command, as ACT 309. Here, since the checkout notification command was received, the processor 51 determines YES in ACT 309 and proceeds to ACT 310. The processor 51 transmits the data of the purchase list 521 in which the member ID included in the checkout notification command was registered to the transaction device 80, as ACT 310. As described above, the processor 51 ends the information processing of the procedure shown in the flowchart of FIG. 14.

The purchaser who moved to the checkout place performs a payment operation on the checkout device 80 that received the data of the purchase list 521. Upon receiving the operation, the checkout device 80 performs a calculation process and a settlement process. Thus, the purchaser who ended the settlement leaves the store through the exit gate.

Figure 10:
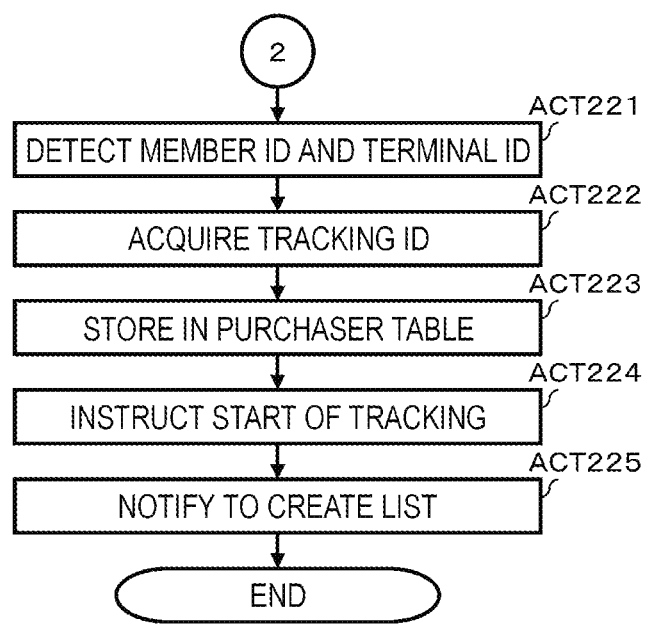
FIG. 10 is a flowchart showing the main part control procedure of the processor in the store server.
Figure 11:
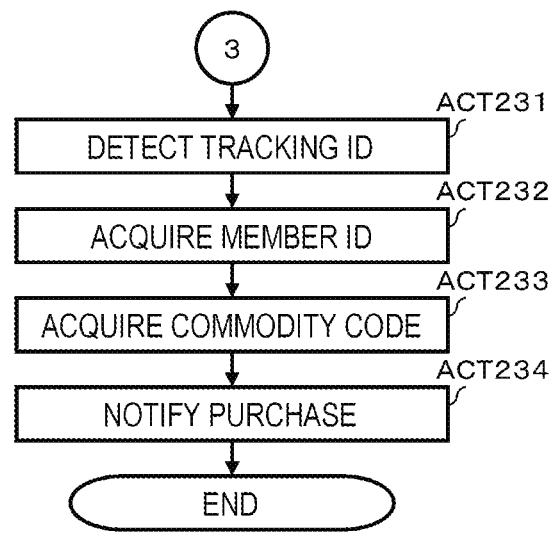
FIG. 11 is a flowchart showing the main part control procedure of the processor in the store server.

As is clear from the above description, the processor 41 configuring the computer of the store server 40 constitutes a purchased commodity specifying unit by executing the processes of ACT 231 to ACT 234 in FIG. 10. That is, the processor 41 specifies the commodity purchased by the purchaser at the sales floor. Then, the processor 51 configuring the computer of the virtual POS server 50 constitutes a purchase list creating unit by executing the process of ACT 306 in FIG. 14 in cooperation with the main memory 52. That is, the processor 51 creates, on the main memory 52, the purchase list 521 that stores the commodity code of the commodity specified by the purchased commodity specifying unit.

The processor 41 constitutes a postponed commodity specifying unit by executing the processes of ACT 241 to ACT 247 in FIG. 12. That is, the processor 41 specifies the commodity whose purchase is postponed based on the action of the purchaser on the commodity at the sales floor. Then, the processor 51 configuring the computer of the virtual POS server 50 constitutes a reservation list creating unit by executing the process of ACT 308 in FIG. 14 in cooperation with the main memory 52. That is, the processor 51 creates, on the main memory 52, the reservation list 522 that stores the commodity code of the commodity specified by the postponed commodity specifying unit.

The processor 41 constitutes an informing unit by executing the processes of ACT 251 to ACT 258 in FIG. 13. That is, the processor 41 informs when there is the commodity specified by the postponed commodity specifying unit, that is, the commodity whose commodity code was registered in the reservation list 522, but not specified by the purchased commodity specifying unit, that is, the commodity whose commodity code was not registered in the purchase list 521. Specifically, the processor 41 informs by displaying the forgotten purchase notification screen SC2 on the touch panel 14 of the user terminal 10 used by the purchaser.

The processor 41 constitutes a receiving unit by ACT 206 of FIG. 8. That is, the processor 41 receives the checkout action notification command transmitted from the action monitoring device 70 as an instruction of checkout for the commodity purchased by the purchaser at the sales floor.

With such a configuration, when the purchaser picks up a commodity displayed at the sales floor, but thinks that it is better to purchase the commodity later and puts the commodity back because the commodity is frozen or refrigerated food, the commodity code of the commodity is registered in the reservation list 522. On the other hand, when the purchaser picks up a commodity displayed at the sales floor and stores the commodity in a container such as a cart, the commodity code of the commodity is registered in the purchase list 521. Then, when the purchaser moves to the checkout place in a state where the commodity registered in the reservation list 522 is not registered in the purchase list 521, the forgotten purchase notification screen SC2 is displayed on the touch panel 14 of the user terminal 10 to inform the forgotten purchase. Therefore, it is possible to provide the shopping support system 1 that can prevent the purchaser from forgetting to purchase the postponed commodity.

In the present embodiment, the postponed commodity specifying unit specifies the returned commodity as a commodity whose purchase is postponed based on the action of the purchaser returning the commodity picked up at the sales floor to the sales floor. Therefore, the purchaser can register the commodity code of the commodity whose purchase is postponed in the reservation list 522 without being aware of it.

As described as the processes of ACT 245 to ACT 247 in FIG. 12, when the processor 41 inquires of the purchaser whether to postpone the purchase of the commodity returned to the sales floor and a response to postpone the purchase is obtained, the commodity is specified as a commodity whose purchase is postponed. Therefore, since there is no inconvenience of registering, in the reservation list 522, even the commodity that was returned to the sales floor without the willingness of the purchaser to purchase, the forgotten purchase commodity can be surely informed.

The processor 41 constitutes a notification unit by executing the process of ACT 261 in FIG. 13. That is, the processor 41 performs the notification by displaying the sales floor notification screen SC3 indicating the sales floor where the commodity informed as a forgotten purchase is sold on the touch panel 14 of the user terminal 10. Therefore, the purchaser can smoothly move to the sales floor where the forgotten purchase commodity is sold.

Second Embodiment

In the first embodiment, a store in which the action monitoring device 70 monitors the action of the purchaser is illustrated. In the second embodiment, a store in which the action monitoring device 70 does not monitor the action of the purchaser is illustrated. That is, in the second embodiment, when a purchaser puts a commodity to be purchased into a cart, the purchaser takes an image of a barcode attached to the commodity with the camera 15 of the user terminal 10 on which the shopping support application is running to read barcode data. When performing a checkout, the user touches a checkout button displayed on the touch panel 14.

When the barcode data is read by the camera 15, a commodity registration command is wirelessly transmitted from the user terminal 10. The commodity registration command includes the member ID and barcode data. When the checkout button is touched, a checkout command, which is an example of a checkout initiation command, is wirelessly transmitted from the user terminal 10. The checkout command includes the member ID. The command wirelessly transmitted from the user terminal 10 is received by the access point 90 and transmitted to the store server 40 via the communication network 100.

Figure 18:
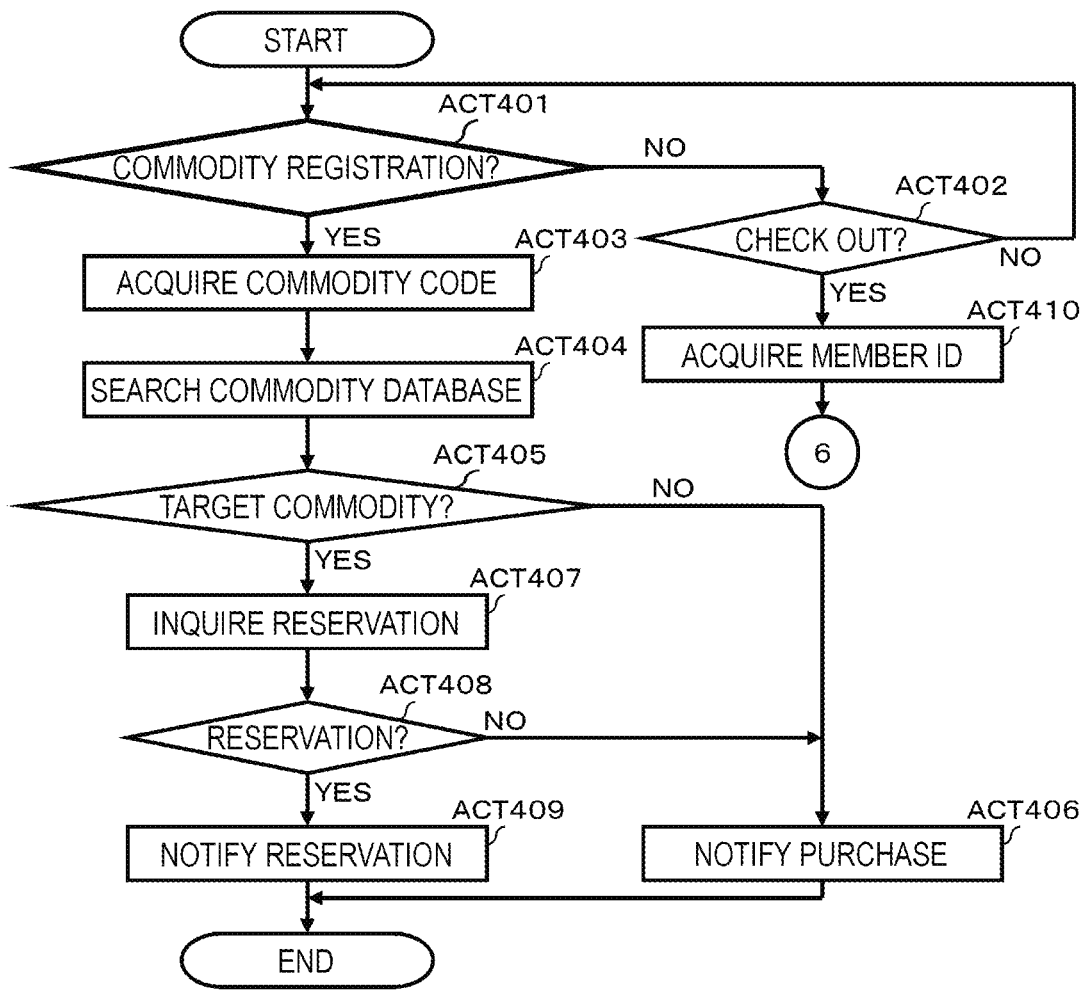
FIG. 18 is a flowchart showing a main part control procedure of the processor in the store server in a second embodiment.

FIG. 18 is a flowchart showing a main part control procedure executed by the processor 41 of the store server 40 in the second embodiment. The processor 41 checks whether a commodity registration command was received, as ACT 401. When the commodity registration command was not received, the processor 41 determines NO in ACT 401 and proceeds to ACT 402. The processor 41 checks whether a checkout command was received, as ACT 402. When a checkout command was not received, the processor 41 determines NO in ACT 402 and returns to ACT 401. Here, in ACT 401 or ACT 402, the processor 41 waits to receive a commodity registration command or a checkout command.

When the commodity registration command is received in the standby state of ACT 401 or ACT 402, the processor 41 determines YES in ACT 401 and proceeds to ACT 403. The processor 41 acquires the commodity code from the barcode data included in the commodity registration command, as ACT 403. Then, the processor 41 searches the commodity database 432 with the commodity code, as ACT 404.

In the present embodiment, a target commodity flag item is added to a commodity data record stored in the commodity database 432. The target commodity flag is 1-bit data for identifying whether the commodity identified by the corresponding commodity code is a postponed target commodity for which purchase is better to be postponed (e.g., a predetermined group of commodities that are commonly postponed for later collection). In the present embodiment, commodities belonging to frozen foods or refrigerated foods are postponed target commodities. That is, the target commodity flag of the commodity data record of such a commodity is data indicating that the commodity is a postponed target commodity, for example, "1". In the following description, a commodity identified by a commodity code is referred to as a registered commodity.

Upon detecting the commodity data record including the corresponding commodity code from the commodity database 432, the processor 41 checks from the target commodity flag of the commodity data record whether the registered commodity is a postponed target commodity, as ACT 405. If the registered commodity is not a postponed target commodity, the processor 41 determines NO in ACT 405 and proceeds to ACT 406. The processor 41 controls the communication interface 44 to send a purchase notification to the virtual POS server 50, as ACT 406. With such control, a purchase notification command is transmitted from the communication interface 44 to the virtual POS server 50 via the communication network 100.

If the registered commodity is a postponed target commodity, the processor 41 determines YES in ACT 405 and proceeds to ACT 407. The processor 41 controls the communication interface 44 to make a reservation inquiry to the user terminal 10, as ACT 407. With such control, a reservation inquiry command is transmitted from the communication interface 44 to the user terminal 10 via the communication network 100.

The reservation inquiry command is wirelessly transmitted via the access point 90 to the user terminal 10 that transmitted the commodity registration command. In the user terminal 10 that received the reservation inquiry command, a reservation inquiry screen SC4 (see FIG. 19) is displayed on the touch panel 14.

Figure 19:
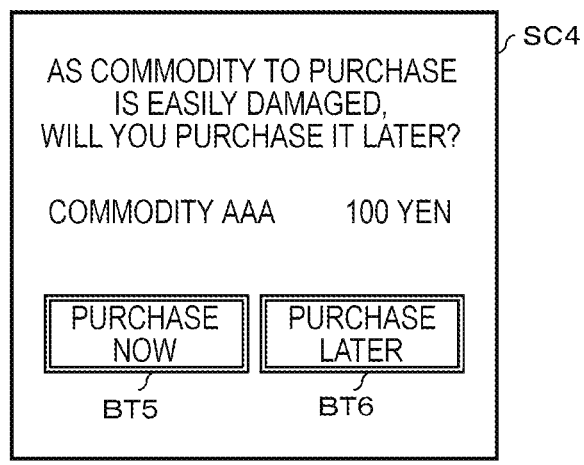
FIG. 19 is a schematic diagram showing an example of a reservation inquiry screen displayed on the user terminal in the second embodiment.

FIG. 19 is an example of the reservation inquiry screen SC4 in the present embodiment. As shown in FIG. 19, on the reservation inquiry screen SC4, a message notifying that the registered commodity is a frozen food or a refrigerated food and is better to postpone to purchase because the commodity is easily damaged, the commodity name and price of the commodity data included in the reservation inquiry command, and the images of a "purchase now" button BT5 and a "purchase later" button BT6 are displayed. The "purchase now" button BT5 is input when the purchaser purchases the registered commodity without postponing. The "purchase later" button BT6 is input when the purchaser purchases the registered commodity later. When the "purchase now" button BT5 is input, a no-reservation command is wirelessly transmitted from the user terminal 10 to the store server 40. When the "purchase later" button BT6 is input, a reservation command is wirelessly transmitted from the user terminal 10 to the store server 40. The no-reservation command or the reservation command is received by the access point 90 and sent to the store server 40 via the communication network 100. The content of the message displayed in FIG. 19 is an example. Any content may be used as long as the content is an inquiry to the purchaser as to whether to purchase the postponed target commodity.

After confirming the reservation inquiry screen SC4, the purchaser determines whether to postpone the barcode-read commodity. In the case of not postponing, the purchaser touches the "purchase now" button BT5 and puts the commodity in the cart. In the case of postponing, the purchaser touches the "purchase later" button BT6 to return the commodity to the sales floor.

It is referred back to the description of FIG. 18. The processor 41 that controlled the transmission of the reservation inquiry command waits for a reservation command, as ACT 406. Here, when a no-reservation command is received via the communication interface 44, the processor 41 determines NO in ACT 406 and proceeds to ACT 404. That is, the processor 41 controls the communication interface 44 to send a purchase notification to the virtual POS server 50.

When a reservation command is received, the processor 41 determines YES in ACT 406 and proceeds to ACT 407. The processor 41 controls the communication interface 44 to send a reservation notification to the virtual POS server 50, as ACT 407. With such control, a reservation notification command is transmitted from the communication interface 44 to the virtual POS server 50 via the communication network 100.

The processor 41 ends the information processing of the procedure shown in the flowchart of FIG. 18 when a purchase notification is made in ACT 404 or a reservation notification is made in ACT 407.

On the other hand, the processor 51 of the virtual POS server 50 operates in the same manner as in the first embodiment. That is, when the purchase notification command is received in ACT 305 of FIG. 14, the processor 51 updates the purchase list 521, as ACT 306. When the reservation notification command is received in ACT 307 of FIG. 14, the processor 51 updates the reservation list 522, as ACT 308.

Therefore, also in the second embodiment, the purchase list 521 stores the commodity code of the commodity put in the cart by the purchaser, and the reservation list 522 stores the commodity code of the commodity returned to the sales floor by the purchaser for purchase later.

When the checkout command is received in the standby state of ACT 401 or ACT 402 in FIG. 18, the processor 41 determines YES in ACT 402 and proceeds to ACT 410 (receiving unit). The processor 41 acquires the member ID from the checkout command, as ACT 410. Thereafter, the processor 41 proceeds to ACT 253 of FIG. 13. Then, the processor 41 executes the processes after ACT 253 in the same manner as described above.

That is, the processor 41 selects the purchase list 521 and the reservation list 522 in which the member ID acquired from the checkout command was registered. Then, when the commodity code is not registered in the reservation list 522, the processor 41 notifies a checkout. When the commodity code is registered in the reservation list 522, the processor 41 compares the commodity code registered in the reservation list 522 with the commodity code registered in the purchase list 521, and determines whether there is a forgotten purchase. When there is no forgotten purchase, the processor 41 notifies a checkout.

When there is a forgotten purchase, the processor 41 sends a forgotten purchase notification to the user terminal 10 of a checkout command transmission source. When a cancellation command is received from the user terminal 10 in response to the forgotten purchase notification, the processor 41 notifies a checkout. On the other hand, when a purchase command is received from the user terminal 10, the processor 41 controls the user terminal 10 to display the sales floor of the forgotten purchase commodity.

In the second embodiment that operates as such, the same operation effects as in the first embodiment can be achieved. That is, even in a store where the action monitoring device 70 does not monitor the action of the purchaser, it is possible to provide a shopping support system for preventing a forgotten purchase of a postponed commodity.

Various embodiments of a shopping support system and a shopping support method have been described above, but the embodiments of the system and method are not limited thereto.

For example, in the first embodiment, when the action monitoring device 70 detects a return action of a purchaser, the store server 40 makes a reservation inquiry to the user terminal 10. When a reservation command is received from the user terminal 10, the store server 40 transmits a reservation notification command to the virtual POS server 50, and updates the reservation list 522 of the purchaser. Therefore, when the action monitoring device 70 detects the return action of the purchaser, the store server 40 may transmit a reservation notification command to the virtual POS server 50 without making a reservation inquiry and updates the reservation list 522 of the purchaser. Here, since the commodity code of the commodity simply returned to the sales floor by the purchaser is also registered in the reservation list 522, it is possible to achieve the effect of preventing the forgotten purchase of the commodity that is included in the forgotten purchase notification but is postponed.

For example, in the first or second embodiment, when a checkout for a commodity purchased by a purchaser at a sales floor is received by the notification of a checkout action or the reception of a checkout command, the purchaser is informed of a forgotten purchase commodity. Regarding the point, the purchase list 521 and the reservation list 522 are periodically collated, regardless of whether the checkout is received, and a commodity having a commodity code that exists in the reservation list 522 but does not exist in the purchase list may be informed as a forgotten purchase commodity. The informing is not limited to the display, and may be informed by voice or the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A shopping support system comprising:
    processing circuitry having programmed instructions to:
        determine whether a commodity is collected for purchase by a purchaser from a sales floor of a store;
        determine whether collection of the commodity has been postponed for later based on an action of the purchaser on the commodity at the sales floor; and
        provide a notification in response to a determination that the commodity has been postponed for later collection and is not collected for purchase by the purchaser.

2. The shopping support system of claim 1, wherein the processing circuitry has programmed instructions to determine whether the commodity has been postponed for later collection based on the purchaser returning the commodity to the sales floor after the commodity has been collected for purchase.

3. The shopping support system of claim 2, wherein the processing circuitry has programmed instructions to:
    provide an inquiry to the purchaser asking whether the purchaser intends to purchase the commodity in response to the purchaser returning the commodity to the sales floor after the commodity has been collected; and
    determine that the commodity has been postponed for later collection in response to receiving a response to the inquiry indicating that the purchaser intends to purchase the commodity.

4. The shopping support system of claim 2, further comprising a plurality of sensors operatively coupled to the processing circuitry and configured to indicate when the commodity is collected for purchase from the sales floor and when the commodity is returned to the sales floor.

5. The shopping support system of claim 1, further comprising a user interface operatively coupled to the processing circuitry, wherein the processing circuitry has programmed instructions to determine that the commodity has been postponed for later collection in response to the purchaser interacting with the user interface.

6. The shopping support system of claim 1, wherein the processing circuitry has programmed instructions to:
    receive commodity identification data identifying the commodity when the purchaser collects the commodity;
    based on the commodity identification data, determine whether the commodity is part of a predetermined group of commodities that are commonly postponed for later collection;
    in response to a determination that the commodity is part of the predetermined group, provide an inquiry to the purchaser asking whether the purchaser intends to postpone collection of the commodity; and
    determine that the commodity has been postponed for later collection in response to receiving a response to the inquiry indicating that the purchaser intends to postpone collection of the commodity.

7. The shopping support system of claim 1, wherein the processing circuitry has programmed instructions to:
    receive a checkout initiation command indicating that the purchaser is ready to begin checkout; and
    provide the notification in response to a determination that the commodity has been postponed for later collection and is not collected for purchase by the purchaser when the checkout initiation command is received.

8. The shopping support system of claim 7, wherein the notification is a first notification and the processing circuitry has programmed instructions to provide a second notification indicating a location of the commodity on the sales floor.

9. The shopping support system of claim 8, further comprising a user interface operatively coupled to the processing circuitry, wherein the processing circuitry has programmed instructions to provide the second notification by controlling the user interface to display a map of the sales floor indicating the location of the commodity on the sales floor.

10. The shopping support system of claim 8, wherein:
    the first notification includes an inquiry to the purchaser asking if the purchaser intends to purchase the commodity; and
    the processing circuitry has programmed instructions to provide the second notification in response to receiving a response to the inquiry indicating that the purchaser intends to purchase the commodity.

11. The shopping support system of claim 7, further comprising a sensor operatively coupled to the processing circuitry, wherein the checkout initiation command includes an indication from the sensor that the purchaser is approaching a checkout area of the store.

12. The shopping support system of claim 7, further comprising a user interface operatively coupled to the processing circuitry, wherein the user interface is configured to provide the checkout initiation command in response to the purchaser interacting with the user interface.

13. The shopping support system of claim 1, further comprising a gate operatively coupled to the processing circuitry and positioned to selectively prevent the purchaser from entering the sales floor, wherein the processing circuitry has programmed instructions to:
receive identification data corresponding to the purchaser; and
control the gate to permit the purchaser to enter the sales floor in response to a determination that the purchaser should be allowed to enter the sales floor based on the identification data.

14. A shopping support method, comprising:
identifying, by processing circuitry, a plurality of commodities collected by a purchaser from a sales floor of a store;
determining, by the processing circuitry, that the purchaser has postponed collection of a first commodity of the plurality of commodities based on an action of the purchaser on the first commodity at the sales floor, and
notifying, by the processing circuitry, the purchaser in response to a determination that the first commodity is not collected by the purchaser.

15. The shopping support method of claim 14, wherein determining, by the processing circuitry, that the purchaser has postponed collection of the first commodity includes determining that the purchaser has returned the first commodity to the sales floor.

16. The shopping support method of claim 15, further comprising:
providing an inquiry asking whether the purchaser intends to purchase the first commodity in response to determining that the purchaser has returned the first commodity to the sales floor; and
determining, by the processing circuitry, that the purchaser has postponed collection of the first commodity in response to receiving a response to the inquiry indicating that the purchaser intends to purchase the first commodity.

17. The shopping support method of claim 14, wherein notifying, by the processing circuitry, the purchaser in response to the determination that the first commodity is not collected by the purchaser includes notifying, by the processing circuitry, the purchaser in response to a determination that the first commodity is not collected by the purchaser and the purchaser is ready to begin checkout.

18. The shopping support method of claim 17, further comprising receiving, by a user interface, a command indicating that the purchaser is ready to begin checkout.

19. The shopping support method of claim 17, further comprising:
identifying, by a sensor, a location of the purchaser within the store; and
determining, by the processing circuitry, that the purchaser is ready to begin checkout based on the location of the purchaser within the store.

20. The shopping support method of claim 14, further comprising providing, by the processing circuitry, a location of the first commodity on the sales floor to the purchaser.

* * * * *